April 1, 1958

C. A. WALDORFF ET AL 2,828,997

DELAY RELEASE FOR PARACHUTES

Filed May 31, 1956

INVENTORS
CHARLES A. WALDORFF
ROBERT E. AINSLIE

BY

ATTORNEYS

April 1, 1958   C. A. WALDORFF ET AL   2,828,997
DELAY RELEASE FOR PARACHUTES

Filed May 31, 1956   2 Sheets-Sheet 2

INVENTORS
CHARLES A. WALDORFF
ROBERT E. AINSLIE
BY
*L. M. Smith, Jr.*
ATTORNEYS

2,828,997
DELAY RELEASE FOR PARACHUTES

Charles A. Waldorff, Timonium, Md., and Robert E. Ainslie, Glenside, Pa., assignors to the United States of America as represented by the Secretary of the Navy Application May 31, 1956, Serial No. 588,592

5 Claims. (Cl. 294—83)

(Granted under Title 35, U. S. Code (1952), sec. 266)

The invention described herein may be used by or for the Government of the United States of America for governmental purposes without the payment of any royalties thereon or therefor.

The present invention relates to a delay release for parachutes and more particularly to a release device which is compact, reliable, and may incorporate a time delay for release during fall.

Present arrangements for separating a falling body from a parachute utilize explosive line cutters for cutting the lines. This type of arrangement has not proved both reliable and instantaneous enough in action.

The present arrangement utilizes a welded body portion having a hook engaged with a bushing holding a line from the load, a buckle for securing the parachute lines, and an explosive time delay initiator and a toggle linkage for effecting the release instantaneously. This arrangement has been incorporated in the patent application "Stabilized Line Dispensing Device," Ser. No. 604,292, filed August 15, 1956, in the names of Robert E. Ainslie, Samuel V. Zinn, Paul Comisarow, and Blanchard S. Hutchins.

An object of the present invention is the provision of a release for permitting the separation of a falling body from its parachute after a given time delay.

Another object is to provide a release device for use between a parachute and a falling body for providing instantaneous and reliable separation when initiated.

A further object of the invention is the provision of a toggle linkage device for connecting a parachute to a falling body which will effect the instantaneous and reliable release of the falling body upon actuation.

A final object of the present invention is the provision of a toggle linkage highly resistant to shock for locking a load to a parachute and permitting instantaneous release with a minimum amount of force.

Other objects and advantages of the invention will hereinafter become more fully apparent from the following description of the annexed drawing, which illustrates a preferred embodiment, and wherein.

Figure 1:
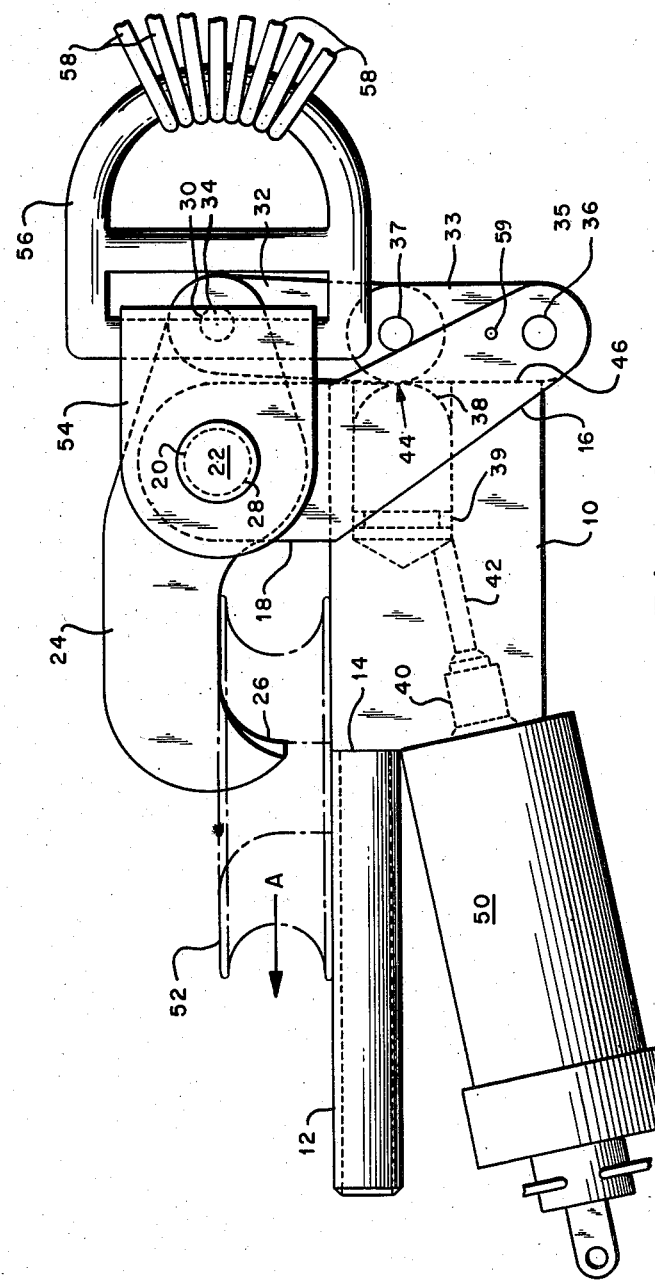
Fig. 1 shows a side elevation of the release unit.
Figure 3:
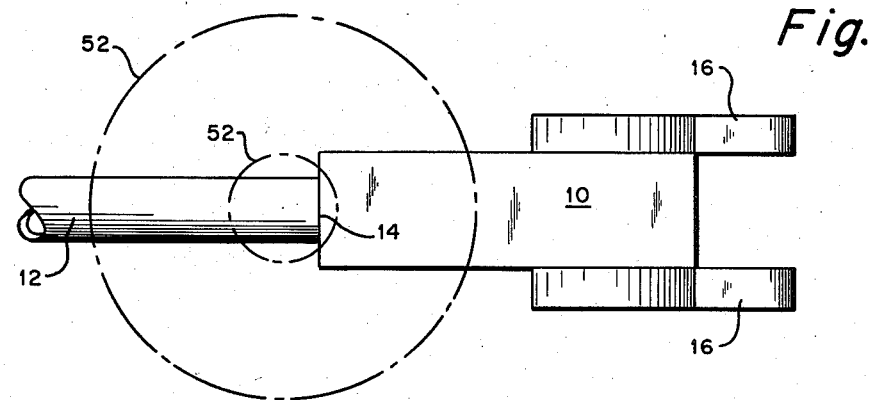
Fig. 3 illustrates a top view of the body and side brackets.

The release mechanism consists of a metal body block 10 having welded thereto at one end a cylindrical tubular section 12 and a pair of side bracket plates 16. Side plates 16 are each provided with an upper extending section 18 having a hole 20 therethrough. A cylindrical shaft 22 passes through holes 20 joining both side plates 16. Mounted for pivotal motion on shaft 22 is a hook member 24 having a hook end 26, a central hole 28 through which shaft 22 passes, and a hole 30 for joining with a link member 32. A short rod or shaft 34 links hook member 24 to link 32 through hole 30 of said hook 24. Another link 33 pivoted on a shaft 35 passing through holes 36 in side plates 16 is connected to link 32 at its opposite end having a hole to match one in link 32. A shaft 37 passes through these holes to effect joining of links 32 and 33 at this point.

Figure 2:
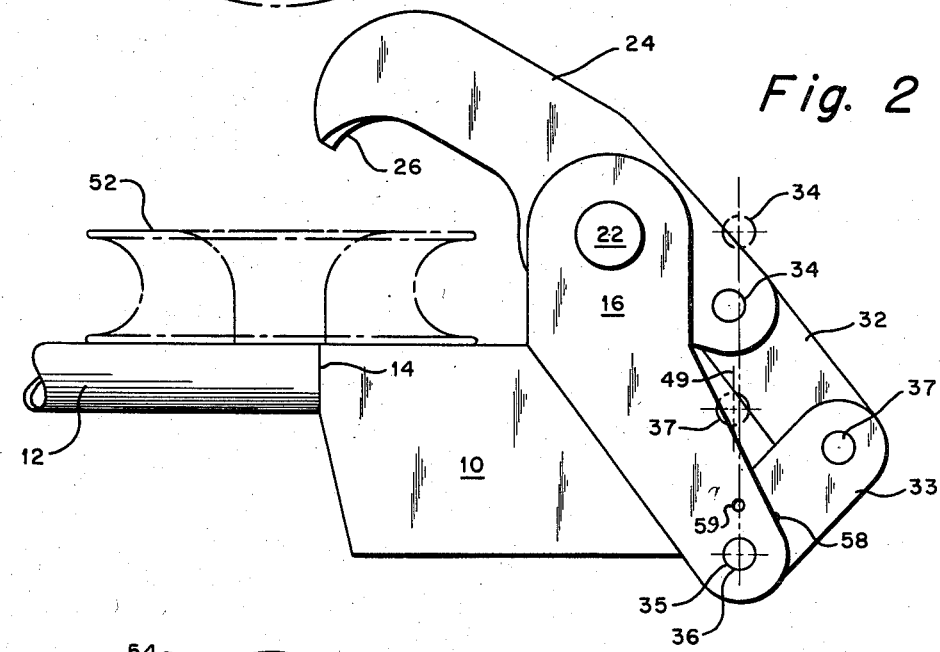
Fig. 2 shows a similar view of just the body and hook linkage.

Block 10 is also provided with a cylindrical hole 39 having a movable piston 38 therein and a threaded opening 40 at the opposite face of block 10. A narrow passageway 42 connects threaded passageway 40 with cylindrical opening 39. Piston 38, resting at its extreme inward position in hole 39, is of such length that its convex surface 44 is approximately in line with the outer surface 46 at this end of block 10. The common pivot point between links 33 and 32, which is the center of shaft 37, is axially aligned with the central axis of piston 38 and when the common surfaces of linkages 33 and 32 are resting against the surface 44 of piston 38 in its extreme left position, the center line of shaft 37 is slightly to the left of center line 49 connecting the centers of openings 34 and 36, as is illustrated in Fig. 2.

An initiator 50 is screwed into the threaded opening 40 in body 10. Initiator 50 may be of a common variety with a delay mechanism so that at a given time, such as two seconds after actuation, it will deliver gases under pressure through passageway 42 to the back of piston 38.

Figure 4:
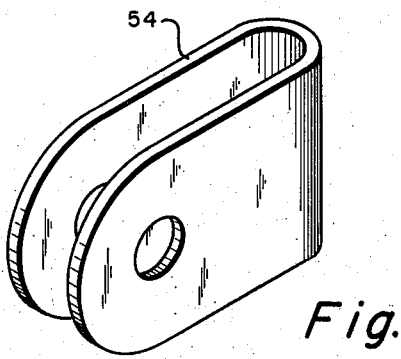
Fig. 4 is an isometric view of the strap.

In Fig. 1 hook 24 is shown in its position engaged with a bushing 52 which has wrapped around it the cord, not illustrated, connected to the load. Mounted on shaft 22, outside the side plates 16, are a pair of metal straps 54 (shown in detail in Fig. 4) engaging a pair of buckles 56 which are attached to the shroud lines 58 of the parachute. Fig. 2 shows hook 24 when disengaged, thereby permitting the release of bushing 52. A pin hole 59 passing through side brackets 16 and link 33 permits the use of a relatively thin safety wire (not illustrated) for preventing normal shock from prematurely kicking the links 33 and 32, thereby releasing hook 24. The safety wire would be thin enough to shear when initiator 50 is energized.

The operation of the device is as follows:

If the release device is placed between a load connected to bushing 52 and a parachute connected through shroud lines 58 to buckles 56, bushing 52 will exert a force on tip 26 or hook 24 in the direction of arrow A. In terms of force this will be converted to an upward force on the inside of hook 26 because of the fact that tip 26 terminates at approximately the central axis of bushing 52. As a result, hook 24 will be urged in a clockwise direction and shaft 34 will be urged in a downward direction. Since the center of shaft 37 joining links 33 and 32 is to the left of center line 49, links 33 and 32 will, by this action, be jammed against surface 44 of piston 38, which is thereby locked against the bottom of opening 37. Hence, the action of the load on hook 24 keeps the former securely locked in place. When it is desired to release the the load, initiator 52 is energized in its usual fashion. The high pressure gases leaving initiator 50 pass through passageway 42 to exert pressure on piston 38 to move the latter. This results in the movement to the right of shaft 37 and links 33 and 32. When shaft 37 moves past center lines 49 joining the centers of shafts 34 and 35, the force exerted by bushing 52 on hook 26 will spring the latter open, since shaft 37 is no longer limited in its movement to the right. Hollow extension 12 may be utilized to mount the unit.

In using the instant release assembly in the line dispensing device described above, the load or line charge connected to bushing 52 is pulled out of the dispensing container by the parachute, connected to straps 58, while at the same time, initiator 50 is energized. In a given period of time covered by the delay of initiator 50, the line charge is partially dispensed from the container and the parachute connected to straps 58 is no longer needed. At this time, the initiator will discharge its gas, thereby releasing bushing 52, permitting the parachute and the release device to fall away free from the remainder of the dispensed line and the airborne container. A bleed hole (not illustrated) may be used to exhaust the gases after actuation.

It is seen from the above construction that there has been provided a release device which can be opened instantaneously by a small amount of piston travel and is highly reliable because of the fact that the load actually acts in a direction so as to maintain the release in its locking position. The device is simple in construction and rugged in design, thereby making it relatively vibration-proof.

Since certain changes in this invention may be made without departing from the spirit and scope thereof it is intended that all matters contained in the foregoing description and shown in the accompanying drawing shall be interpreted as illustrative and not in a limiting sense.

What is claimed is:

1. In a mechanism for releasing a load from a support, a body, hook means mounted on said body for engaging said load, pivot means supporting said hook means intermediate the ends thereof for engagement at said pivot means with said support, said hook means when engaged with said load being urged by said load in the direction of releasing said load, movable piston means in said body, linkage means contacting said piston means comprising a pair of extended elements pivoted on a common shaft and having the opposite ends thereof pivoted on the body and the opposite end of said hook means, respectively, said common shaft being movable between a locked condition preventing releasing movement of said hook means and a free condition permitting release of said load by said hook means, means supplying high pressure gas to said piston to urge said common shaft from said locked condition to said free condition for initiating the actuation of said mechanism for bringing about the release of said load, and means for insuring that the force of said load on said hook means is maintained in the proper direction.

2. In a mechanism for releasing a load from a parachute, a body, hook means pivoted intermediate its ends on said body for engaging said load at one end, means to insure that the force of said load on said hook means is maintained in the direction of disengageing said hook means from said load, linkage means connected between the other end of said hook and said body and movable between a first condition blocking release of said hook means from said load and a second condition permitting said release, a cylindrical opening in said body having a movable piston therein, the latter having a face in contact with said linkage means, and means capable of urging said piston in the direction of moving said linkage means into said second condition.

3. In a mechanism for releasing a load from a parachute, a body, hook means pivoted intermediate its ends on said body for engaging said load at one end, means to insure that the force of said load on said hook means is maintained in the direction of disengaging said hook means from said load, linkage means connected between the other end of said hook means and said body and movable between a first condition blocking release of said hook means from said load and a second condition permitting said release, a cylindrical opening in said body having a movable piston therein, the latter having a face in contact with said linkage means, means attached to said body capable of supplying high pressure fluid to the opposite face of said piston urging the latter in the direction of moving said linkage means into said second condition.

4. In a mechanism for releasing a load from a parachute, a body, hook means pivoted intermediate its ends on said body for engaging said load at one end, means to insure that the force of said load on said hook means is maintained in the direction of disengaging said hook means from said load, linkage means comprising a pair of extended elements pivoted on a common shaft and having the opposite ends of said elements pivoted on the body and the other end of said hook means, respectively, said common shaft movable between a first condition blocking release of said hook means from said load and a second condition permitting said release, a cylindrical opening in said body having a movable piston therein, the latter having a face in contact with said linkage means, means capable of supplying high pressure gas to the opposite face of said piston urging the latter in the direction of moving said common shaft into said second condition.

5. In a mechanism for releasing a load from a parachute, a body having a top face and a side face, hook means pivoted intermediate its ends on said top face of said body for engaging said load at one end of said hook means, means extending from said top face for insuring that the force of said load on said hook means is maintained in a direction of disengaging said hook means from said load, linkage means connected between the other end of said hook means and said side face of said body and movable between a first condition blocking release of said hook means from said load and a second condition permitting said release, a cylindrical opening in said body extending from said side face having a movable piston therein, the latter having a face in contact with said linkage means, means attached to said body capable of supplying high pressure fluid to the opposite face of said piston urging the latter in the direction of moving said linkage means from said first condition into said second condition.

References Cited in the file of this patent

UNITED STATES PATENTS

| 1,242,809 | Irwin | Oct. 9, 1917 |
| 1,383,252 | Wearham | June 28, 1921 |
| 1,725,473 | Page | Aug. 20, 1929 |
| 2,131,445 | Lawton | Sept. 27, 1938 |